United States Patent
Viswanathan et al.

(10) Patent No.: US 11,392,400 B2
(45) Date of Patent: Jul. 19, 2022

(54) ENHANCED MIGRATION OF CLUSTERS BASED ON DATA ACCESSIBILITY

(71) Applicant: HEWLETT PACKARD ENTERPRISE DEVELOPMENT LP, Houston, TX (US)

(72) Inventors: Swami Viswanathan, Morgan Hill, CA (US); Xiongbing Ou, San Jose, CA (US); Vadim Finkelstein, San Francisco, CA (US); Kartik Mathur, Foster City, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 75 days.

(21) Appl. No.: 16/514,434

(22) Filed: Jul. 17, 2019

(65) Prior Publication Data
US 2021/0019162 A1 Jan. 21, 2021

(51) Int. Cl.
*G06F 9/455* (2018.01)
*G06F 9/48* (2006.01)

(52) U.S. Cl.
CPC ........ *G06F 9/45558* (2013.01); *G06F 9/4856* (2013.01); *G06F 2009/4557* (2013.01)

(58) Field of Classification Search
CPC .................................................. G06F 9/45558
USPC ............................................................ 718/1
See application file for complete search history.

(56) References Cited

U.S. PATENT DOCUMENTS

| | | | | |
|---|---|---|---|---|
| 9,632,809 | B2* | 4/2017 | Nakashima | G06F 9/45558 |
| 10,083,057 | B1* | 9/2018 | Currie | G06F 9/45558 |
| 2009/0228589 | A1* | 9/2009 | Korupolu | H04L 67/1002 709/226 |
| 2013/0081015 | A1* | 3/2013 | Noma | G06F 9/45558 718/1 |
| 2014/0068210 | A1* | 3/2014 | Deguchi | G06F 11/2058 711/162 |
| 2014/0157269 | A1* | 6/2014 | Dow | G06F 9/45558 718/1 |
| 2014/0181294 | A1* | 6/2014 | Deshpande | G06F 9/485 709/224 |
| 2015/0169341 | A1* | 6/2015 | Gulati | G06F 3/067 718/1 |
| 2015/0229583 | A1* | 8/2015 | Ponsford | G06F 9/5077 709/226 |
| 2016/0004552 | A1* | 1/2016 | Innan | H04L 67/1008 718/1 |
| 2016/0283257 | A1* | 9/2016 | Antony | G06F 9/45533 |
| 2017/0220394 | A1* | 8/2017 | Shim | G06F 9/5088 |
| 2017/0295082 | A1* | 10/2017 | Wu | H04L 67/10 |
| 2018/0004425 | A1* | 1/2018 | Suzuki | G06F 11/3433 |

(Continued)

*Primary Examiner* — Mehran Kamran
(74) *Attorney, Agent, or Firm* — Jaffery Watson Mendonsa & Hamilton (57) ABSTRACT

Described herein are systems, methods, and software to migrate virtual nodes of a data processing cluster. In one implementation, a management system monitors an executing data processing cluster on one or more first hosts to determine when the data processing cluster satisfies migration criteria. Once satisfied, the management system selects one or more second hosts to support the data processing cluster based on accommodation data associated with the hosts. After selection, the management system may initiate operations to migrate the data processing cluster from the one or more first hosts to the one or more second hosts.

20 Claims, 7 Drawing Sheets

(56) References Cited

U.S. PATENT DOCUMENTS

| | | | |
|---|---|---|---|
| 2018/0046581 A1* | 2/2018 | Banerjee | G06F 12/1009 |
| 2018/0052704 A1* | 2/2018 | Ohnishi | G06F 9/45558 |
| 2018/0329647 A1* | 11/2018 | Dai | G06F 3/0604 |
| 2019/0026030 A1* | 1/2019 | Yang | G06F 3/0649 |
| 2019/0065096 A1* | 2/2019 | Sterin | G06F 16/1824 |

* cited by examiner

| HOST ID COLUMN 410 | RESOURCE COLUMN 420 | RESOURCE COLUMN 430 | RESOURCE COLUMN 440 | RESOURCE COLUMN 450 | RESOURCE COLUMN 460 |
|---|---|---|---|---|---|
| HOST ID 411 | VALUE 421 | VALUE 431 | VALUE 441 | VALUE 451 | VALUE 461 |
| HOST ID 412 | VALUE 422 | VALUE 432 | VALUE 442 | VALUE 452 | VALUE 462 |
| HOST ID 413 | VALUE 423 | VALUE 433 | VALUE 443 | VALUE 453 | VALUE 463 |
| • • | • • | • • | • • | • • | • • |

ENHANCED MIGRATION OF CLUSTERS BASED ON DATA ACCESSIBILITY

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various large-scale processing applications and frameworks have been developed to interact with such large data sets, including Hive, HBase, Hadoop, Spark, among others.

At the same time, virtualization techniques have gained popularity and are now commonplace in data centers and other computing environments in which it is useful to increase the efficiency with which computing resources are used. In a virtualized environment, one or more virtual nodes are instantiated on an underlying physical computer and share the resources of the underlying computer. Accordingly, rather than implementing a single node per host computing system, multiple nodes may be deployed on a host to more efficiently use the processing resources of the computing system. These virtual nodes may include full operating system virtual machines, containers, such as Linux containers or Docker containers, jails, or other similar types of virtual containment nodes. However, although virtualization techniques provide increased efficiency within computing environments, difficulties can arise in assigning the virtual nodes to host systems in a computing environment. These difficulties are compounded when resources, such as storage resources available to the cluster, are dynamic during the life-cycle of the cluster.

SUMMARY

The technology described herein manages the migration of data processing clusters in a computing environment. In one implementation, a method includes executing a data processing cluster on one or more first hosts of a plurality of hosts, the data processing cluster comprising virtual nodes that process data stored in one or more data repositories. The method further provides determining when one or more migration criteria are satisfied for the data processing cluster and identifying accommodation data associated with the data processing cluster. The method also includes determining one or more second hosts of the plurality of hosts for the data processing cluster based on the accommodation data and migrating the data processing cluster from the one or more first hosts to the one or more second hosts.

DETAILED DESCRIPTION

Figure 1:
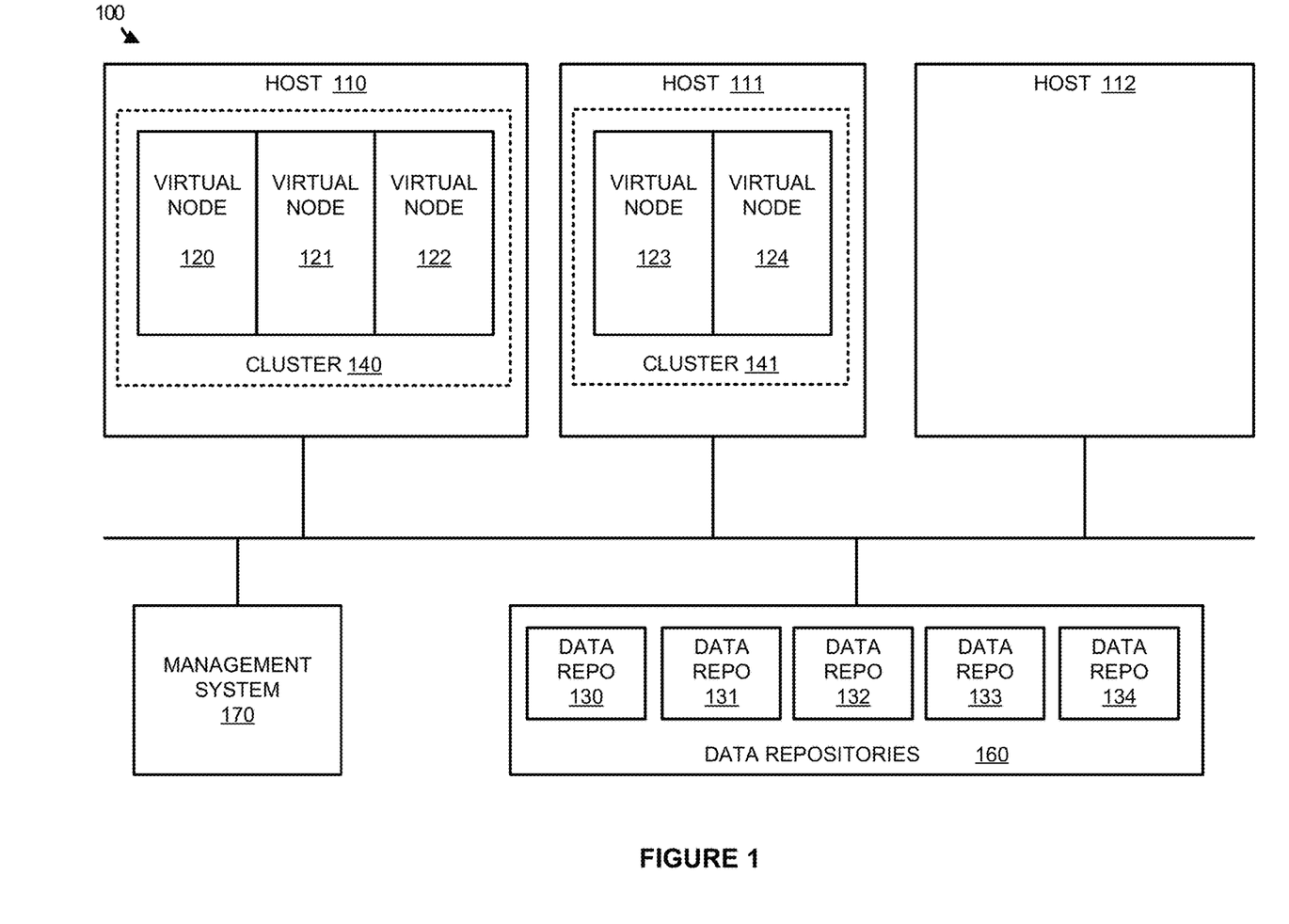
FIG. 1 illustrates a computing environment for the deployment of data processing clusters according to an implementation.

FIG. 1 illustrates a computing environment 100 for the deployment of data processing clusters according to an implementation. Computing environment 100 includes hosts 110-112, management system 170 and data repositories 160. Hosts 110-111 include clusters 140-141 that are representative of data processing clusters that include virtual nodes 120-124. Data repositories 160 include data repositories 130-134 that are representative of distribute file system storage repositories or object storage repositories available for processing by clusters in computing environment 100.

In operation hosts 110-112 are deployed in computing environment 100 to provide a platform for the execution of data processing clusters. These data processing clusters may each comprise virtual nodes that distributivity process data from one or more data repositories in data repositories 160. The data processing operations of the virtual nodes may comprise MapReduce operations, data search operations, or some other similar operations on data sets within the one or more data repositories. In some examples, the data repositories may be stored on the same host computing systems as the virtual nodes, however, the data repositories may be located on one or more other computing systems, such as server computers, desktop computers, or some other computing system. The data repositories may each represent data stored as a distributed file system, as object storage, or as some other data storage structure.

In deploying the clusters to hosts 110-112, management system 170 may be responsible for allocating computing resources to the clusters, and deploying the virtual nodes required for the clusters. The virtual nodes may comprise full operating system virtual machines or containers. The containers may comprise Linux containers, Docker containers, and other similar namespace-based containers. Rather than requiring a separate operating system, which is required for virtual machines, containers may share resources from the host computing system, wherein the resources may include kernel resources from the host operating system and may further include repositories and other approved resources that can be shared with other containers or processes executing on the host. However, although resources may be shared between the containers on a host, the containers are provisioned to have private access to the operating system via their own identifier space, file system structure, and network interfaces. The operating system may also be responsible for allocating processing resources, memory resources, network resources, and other similar resources to the containerized endpoint.

Here, cluster 140 is deployed with virtual nodes 120-122 on host 110 and cluster 141 is deployed with virtual nodes 123-124 on host 111. In some implementations, the clusters may be deployed based on the ability of a particular host to accommodate the virtual nodes of the cluster. The accommodation data may be related to the physical resources on the host, the accessibility of a particular data repository to the host, information about the other clusters operating on the host, or some other factor. The physical resource considerations may include available physical processing system resources, memory resources, storage resources, communication interface resources, or some other physical resource. The accessibility information corresponding to the data repositories may include latency in accessing data from a data repository of interest, data throughput to the data repository of interest, or some other accessibility information related to the data repository for the cluster.

After a cluster is deployed in computing environment 100, management system 170 may further monitor when a cluster satisfies migration criteria. In some implementations, the migration criteria may be satisfied based on monitoring the accommodation data for the cluster. As an example, cluster 141 may process data corresponding to data repository 130. While executing the cluster, latency may be identified in obtaining or transferring data to data repository 130. Once the latency satisfies criteria for the cluster, management system 170 may use the accommodation corresponding to hosts 110-112 to determine a different host that can support cluster 141. After the new host is identified, management system 170 may migrate the cluster, wherein the migration may include stopping execution of the nodes on the first host and initiating execution on the second host.

In some implementations, the criteria for deploying and migrating the clusters in computing environment may be determined based on a quality of service associated with the deployed cluster. For example, tenants of computing environment may be allocated a minimum quality of service for the clusters deployed by each of the tenants. The minimum quality of service may define physical resource requirements for the host, accessibility requirements to data repositories, or some other similar requirements.

Figure 2:
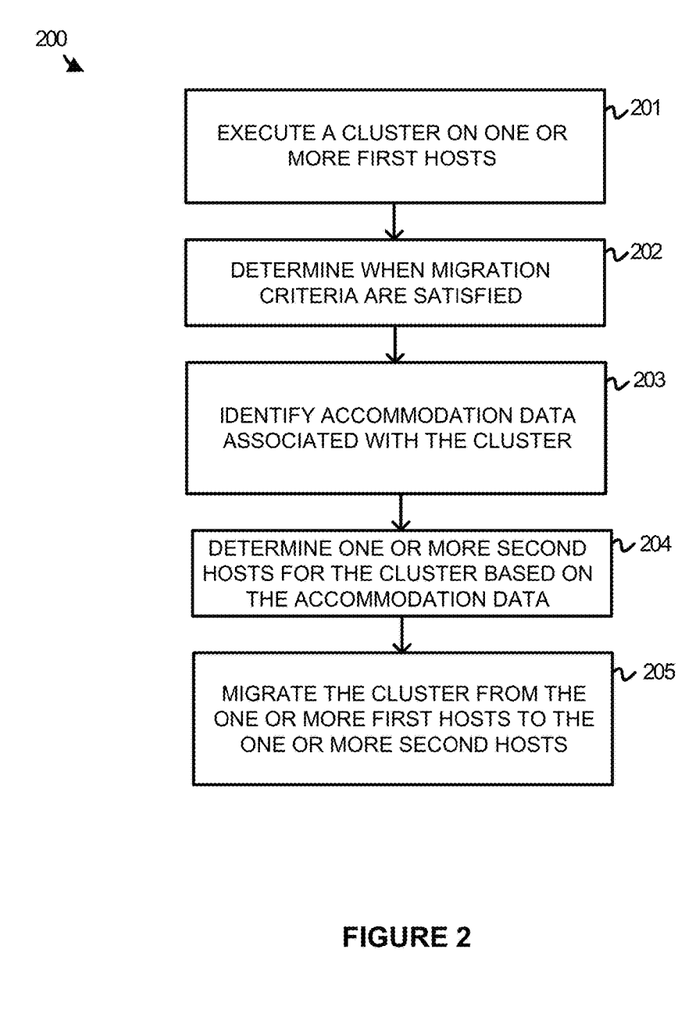
FIG. 2 illustrates an operation to migrate a cluster between hosts according to an implementation.

FIG. 2 illustrates an operation 200 to migrate a cluster between hosts according to an implementation. The processes of operation 200 are referenced parenthetically in the paragraphs that follow with reference to systems and elements of computing environment 100. Operation 200 may be implemented by management system 170 or may be implemented using multiple hosts and other computing elements from computing environment 100.

As depicted, operation 200 includes executing (201) a cluster on one or more first hosts in the computing environment. For example, virtual nodes 120-122 of cluster 140 execute on host 110 to provide various distributed data processing operations. In deploying cluster 140, management system 170 may identify one or more hosts suitable for the cluster based on accommodation data and initiate the execution of the required nodes on the identified host or hosts. The accommodation data may be based on the physical resource requirements for the cluster, data repository requirements for the cluster, or some other requirement for the cluster. During the execution of the cluster, operation 200 further determines (202) when migration criteria are satisfied for the cluster to be migrated from the first hosts to second hosts. The migration criteria may be associated with data accessibility, may be associated with data processing rate for the cluster, or any other criteria related to the operational state of the cluster. In some implementations, a data processing cluster may change from processing data from a first storage location to another storage location. Consequently, a host that may have initially provided an adequate quality of service for a cluster may no longer be capable of providing the required quality of service when a data storage location is changed for the cluster (e.g., first processing data from data repository 130 and moving to processing data from data repository 132).

In addition to determining when the migration criteria are satisfied, operation 200 identifies (203) accommodation data associated with the cluster, wherein the accommodation data corresponds to the ability of the hosts to accommodate the executing cluster. The accommodation data may correspond to the physical resources available on the host, the accessibility of the data storage to the host, or some other accommodation data. The accommodation data may be determined in response to the migration criteria being satisfied, at periodic intervals, or at some other instance or interval. Once the accommodation data is determined, operation 200 further determines (204) one or more second hosts for the cluster based on the accommodation data and migrate (205) the cluster from the one or more first hosts to the one or more second hosts.

Referring to an example of migrating cluster 140, management system 170 may determine the ability for hosts 111-112 to accommodate virtual nodes 120-122 of the cluster. If host 112 is determined to better accommodate the virtual nodes based on the physical resource availability and/or data accessibility, then management system 170 may initiate operations to migrate virtual nodes 120-122 to host 112. This migration may include stopping the virtual nodes on host 110, storing or caching the images for virtual nodes 120-122 on host 112, and initiating execution of the virtual nodes on host 112. Additionally, the migration operations may include configuring virtual and physical networking, allocating addressing and communication permissions to the cluster to operate on host 112, or providing some other migration operation.

In some implementations, the virtual nodes that are executed in computing environment 100 may execute via persistent and non-persistent storage for the nodes. As an example, virtual node 123 executing on host 111 may include non-persistent storage, or storage that is used for the execution of the virtual node on a particular host, and persistent storage that is used by the virtual node when node migrated between hosts in computing environment 100. The non-persistent storage may include non-stateful data, such as executable files and directories for the virtual node, whereas the persistent storage may include stateful data, such as settings and configuration data for the virtual node. The persistent data for the virtual node may be stored on another serving computing system, desktop computing system, network attached storage device, or some other device that can be accessed by the host computing system. When a virtual node is required to be migrated from a first host to a second host, the non-persistent portion, which may comprise an image of non-modified data, is stored on the second host to make the virtual node executable on the second host. Once stored on the second host, the virtual node on the first host may be stopped, while the virtual node is initiated on the second host, where the virtual node on the second host will use the non-persistent data stored locally on the second host and the persistent data from the shared location (carried over from the first host).

Figure 3A:
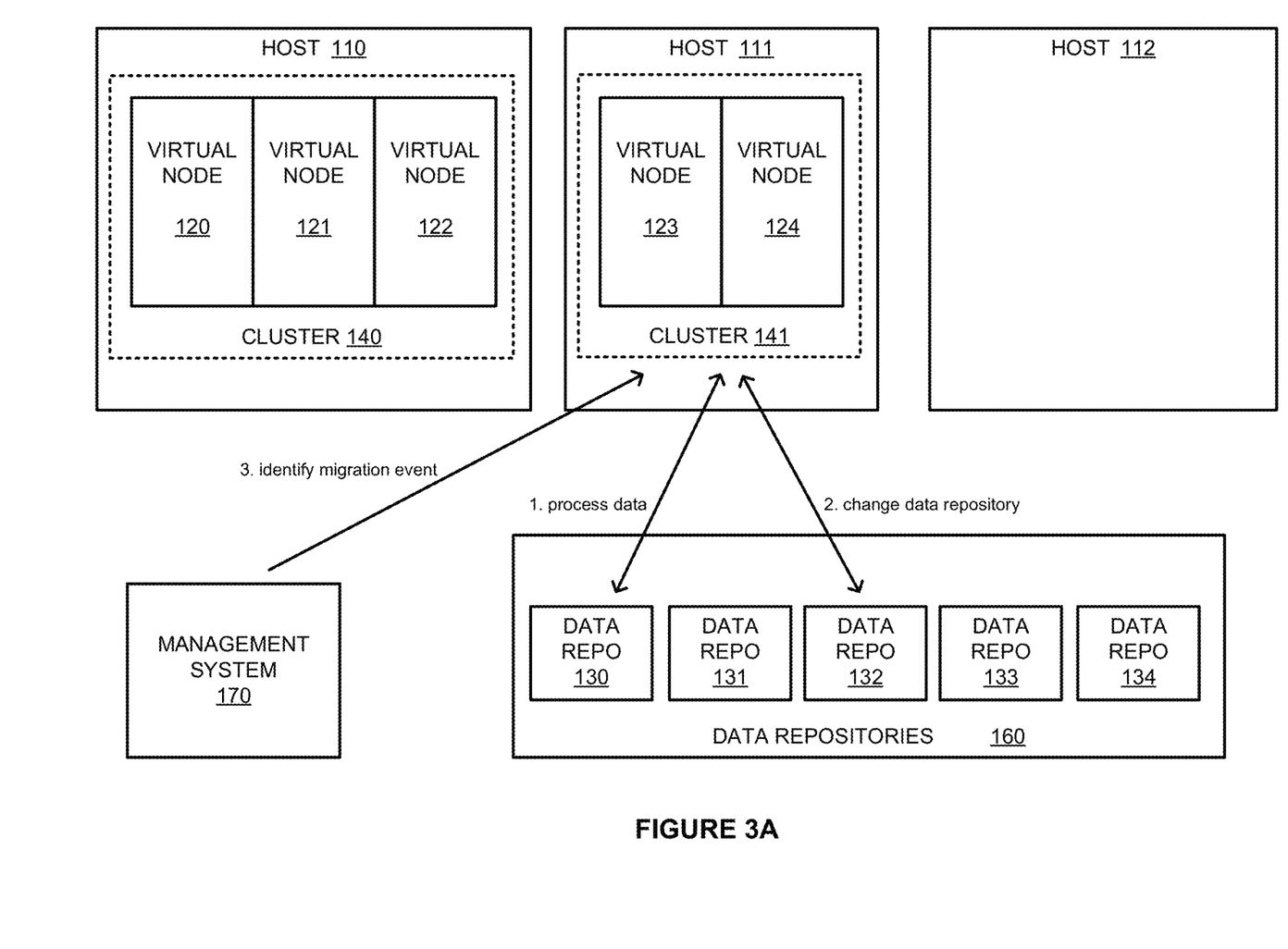
FIGS. 3A-3B illustrate an operational scenario of migrating a cluster according to an implementation.
Figure 3B:
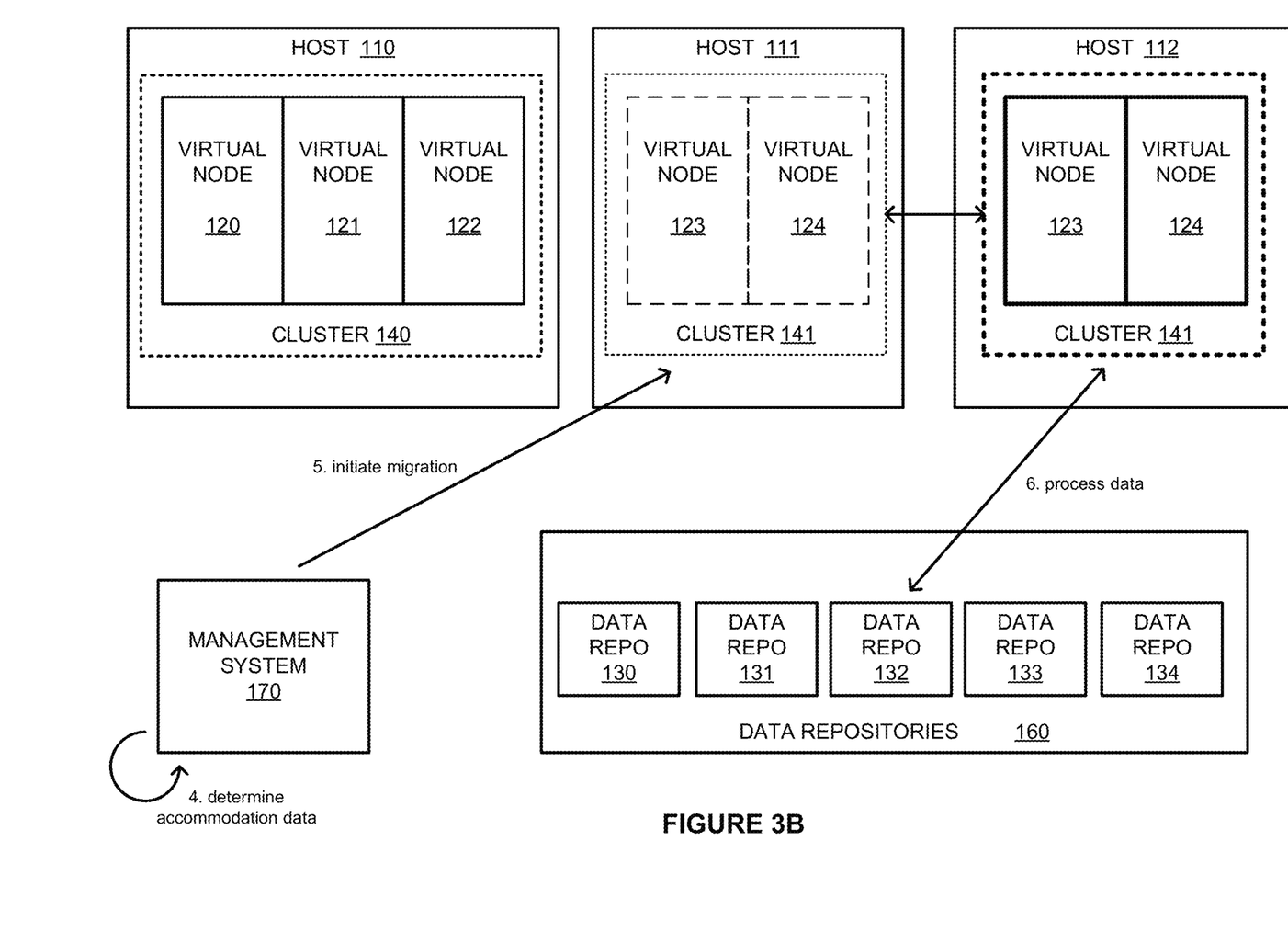

FIGS. 3A-3B illustrate an operational scenario of migrating a cluster according to an implementation. FIGS. 3A-3B include systems and elements of computing environment 100 from FIG. 1.

Referring first to FIG. 3A, cluster 141 processes, at step 1, data corresponding to data repository 130. Data repository 130 may comprise a distributed file system storage repository, a data object storage repository, or some other storage system available for distributed data processing from cluster 141. Examples of storage repository 130 may be stored using versions of the Hadoop distributed file system (HDFS), versions of the Google file system, versions of the Gluster file system (GlusterFS), or any other distributed file system version. Data repository 130 may also be stored using object storage systems such as Swift. During the execution of the cluster, cluster 141 may change, at step 2, to processing data from data repository 132. Data repository 132 may be located on the same physical storage systems as data repository 130 or may be located on different storage systems than data repository 130. The change from data repository 130 to data repository 132 may be based on a configuration change by an administrator associated with cluster 141, may be initiated based on the state of the cluster (e.g., a cluster capable of traversing and processing data from two data repositories), or may be initiated in any other manner. As the cluster is changed to processing data from data repository 132, management system 170 may identify, at step 3, the change in the data repository for cluster 141. In some implementations, the identification may occur based on the administrative input to change the associated data repository (e.g., the selection of data repository 132), may occur based on monitoring the data interactions of the cluster, or may occur at any other instance.

Turning to FIG. 3B, once management system 170 identifies that virtual cluster 141 has changed from processing data of data repository 130 to data repository 132, management system 170 may determine, at step 4, accommodation data associated with hosts 110-112. The accommodation data may include the latency associated with interacting with the new data repository, the data throughput in obtaining data associated with the repository, the physical resources available on the hosts, or some other accommodation data. In at least one implementation, the accommodation data may be used to determine whether a migration is required for the cluster. For example, management system 170 may determine whether any other host in the computing environment is capable of providing a better quality of service than the current host. If no other host is capable of providing a better quality of service, then cluster 141 may remain executing the cluster. However, as depicted in FIG. 3B, when another host is capable of providing a better quality of service, such as providing lower latency or better data throughput to data repository, management system 170 may select another host as a platform for the cluster. In some implementations, determining a host or hosts for a migration, management system 170 may identify quality of service requirements associated with the cluster and may select a host from a set of hosts that satisfy the quality of service requirements. The quality of service requirements may include accessibility requirements to the data repository, physical resource requirements of the host, or some other requirement associated with the cluster. The quality of service requirements may be defined based on a tenant identifier associated with the cluster, wherein the computing environment may support clusters from a plurality of tenants (e.g., organizations, organization divisions, etc.).

Once a host is identified for the migration of a cluster, management system 170 may initiate, at step 5, the migration of the cluster from host 111 to host 112. In initiating the migration, management system 170 may stop the execution of the cluster on host 111, provide and store the images for the cluster on host 112, and initiate execution of the cluster on host 112. In providing cluster 141 to host 112, management system 170 may determine the state of cluster 141 on host 111 when the cluster is stopped on host 111, and store the cluster with the required state on host 112. Once cluster 141 is initiated on host 112, the cluster may process, at step 6, data from data repository 132.

In some implementations, each of the nodes in the clusters may include a persistent portion that is stored separate from the hosts executing the node. In these examples, the nodes may each comprise a non-persistent portion of data, which includes data that is not modified as part of the state of the nodes and may be stored locally on the executing host. The nodes may further each comprise a persistent portion of data that includes stateful data (e.g., configuration data, data processing status information, and the like), which is stored on another storage system that is accessible to all of the hosts of the computing environment. Advantageously, when a node is to be migrated from a first host to a second host, a new non-persistent data portion may be loaded on the second host, and the new non-persistent data portion may be combined with the persistent data portion from the first host to execute the virtual node on the second host.

Figure 4:
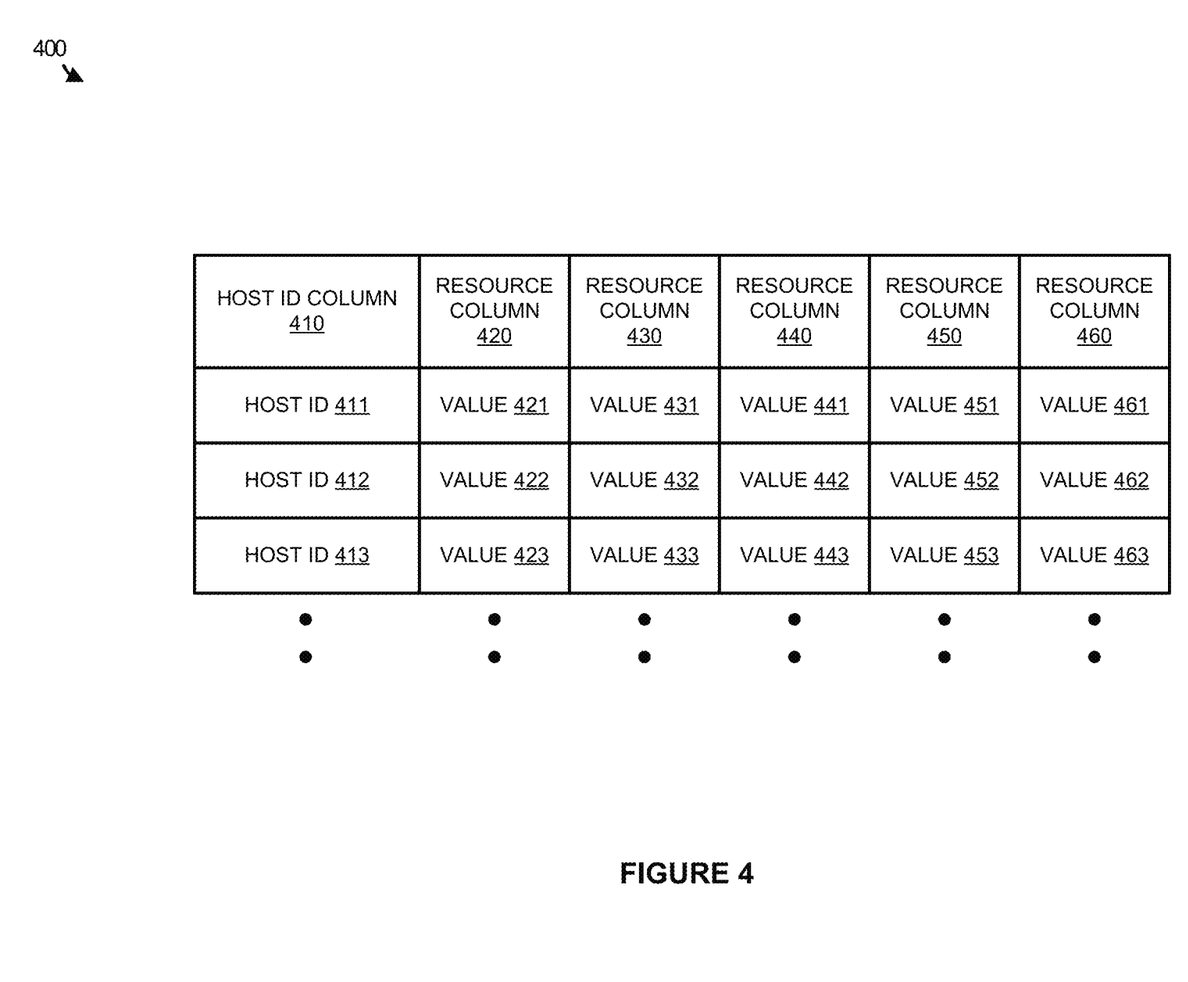
FIG. 4 illustrates a data structure for maintaining accommodation data according to an implementation.

FIG. 4 illustrates a data structure 400 for maintaining accommodation data according to an implementation. Data structure 400 includes host identifier column 410, resource columns 420, 430, 440, 450, and 460. Host identifier column 410 includes host identifiers 411-413, which are representative of Resource columns 420, 430, 440, 450, and 460 includes values 421-423, 431-433, 441-443, 451-453, and 461-463.

As described herein, clusters may be deployed in a computing environment to provide various large scale and distributed data processing operations. During the execution of the clusters, a management system for the computing environment may monitor and determine when clusters are to be migrated from one or more first hosts to one or more second hosts. A cluster may be migrated when the cluster satisfies criteria, wherein the criteria may comprise data processing rate, a change in the data repository of interest, a change in data throughput from the data repository, or some other criteria.

Once the criteria are satisfied, the management system may consult a data structure or structures, such as data structure 400, to determine the one or more hosts for the migrating cluster. Data structure 400 includes resource columns 420, 430, 440, 450, and 460 that are representative of accommodation data for hosts of the computing environment. The accommodation data may indicate processing resources available for a cluster, data accessibility information for data repositories available in the computing environment, or some other information. Based on the data accessibility information, the management system may select one or more hosts to support the cluster. In some implementations, each of the clusters may be associated with quality of service requirements. As a result, when a migration is required, the management system may identify hosts with accommodation data capable of providing the required quality of service, and select one or more of the capable hosts to support the cluster.

In some implementations, data structure 400 may be used to determine when a migration event occurs or when migration criteria are satisfied for a cluster. As an example, the management system may monitor the various values in data structure 400 for the current one or more hosts of the cluster and determine when the values fail to meet quality of service criteria for the cluster. In failing to satisfy the quality of service criteria, the values may be compared to minimum values for the cluster, may be compared to other hosts in the computing environment, or may be compared in any other manner. Once the criteria are satisfied, data structure 400 may be used to determine one or more other hosts to support the execution of the cluster.

Figure 5:
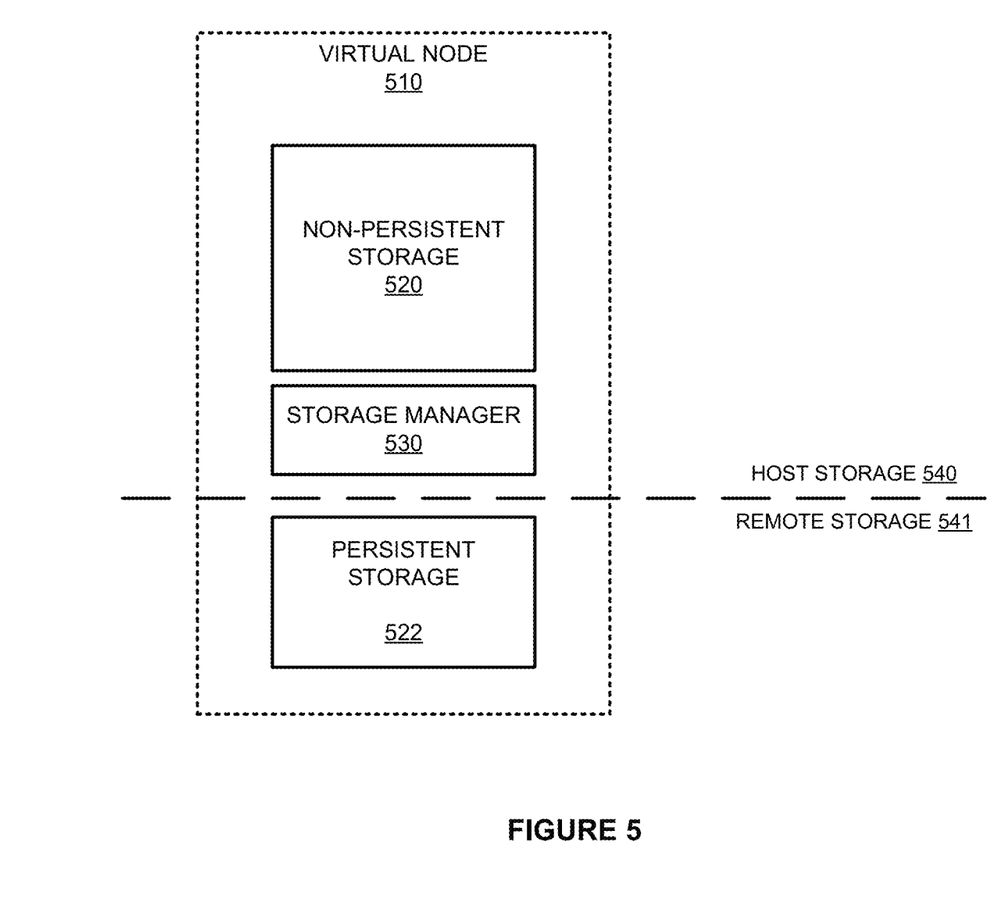
FIG. 5 illustrates a virtual node of data processing computing environment according to an implementation.

FIG. 5 illustrates a virtual node 510 of a data processing computing environment according to an implementation. Virtual node 510 includes non-persistent storage 520, storage manager 530, and persistent storage 522. Non-persistent storage 520 and storage manager 530 are representative of data objects that are stored as part of host storage 540, while persistent storage 522 is representative of data objects that are stored as part of remote storage 541.

As described herein, when virtual nodes are deployed as part of a data processing cluster in a computing environment, the virtual nodes may include persistent storage and non-persistent storage that can be configured as part of the image for the virtual nodes. In particular, persistent storage may correspond to data objects (files, executables, and the like) that are stateful and may change as part of the operation of the cluster. These persistent data objects may include configuration files, data processing state information, or some other stateful information for the cluster. To ensure that the persistent storage is available to the virtual node as it is migrated between hosts, persistent storage 522 is stored remotely from the executing host and is accessible to multiple hosts in the computing environment using Ethernet, Fibre Channel, peripheral component interconnect express (PCIe), or some other interconnect.

In addition to the persistent storage, virtual node 510 includes non-persistent storage 520 and storage manager 530 (which may be considered as part of non-persistent storage 520 in some examples). This data may include non-stateful data for the execution of the node. Examples of non-persistent storage may include log files, executables, or some other data. In separating persistent and non-persistent data, a virtual node may more efficiently be migrated from a first host to a second host. As an example, when a virtual node is deployed, a first portion of data associated with the virtual node may be stored locally on the executing host, while a second portion of data may be stored remotely in a persistent data store. When a migration event occurs, a new non-persistent version of data may be stored locally on a second host and used in conjunction with the remotely stored persistent data to provide continued operations of the virtual node. Thus, when the node is stopped on the first host, the non-persistent data is ready on the second host to resume operations of the virtual node without migrating data from the first host to the second host.

Figure 6:
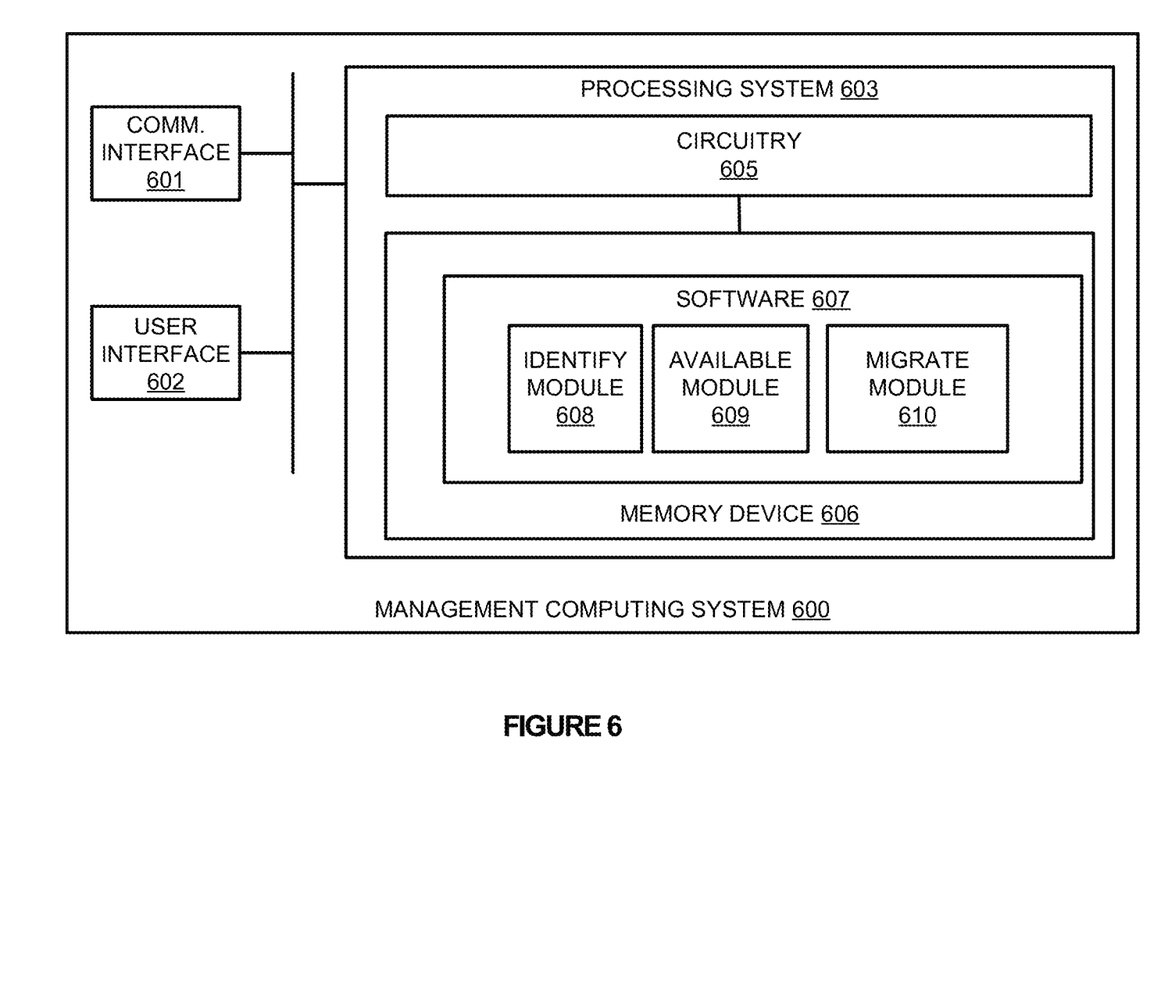
FIG. 6 illustrates a management computing system to manage cluster migration according to an implementation.

FIG. 6 illustrates a management computing system 600 according to an implementation. Computing system 600 is representative of any computing system or systems with which the various operational architectures, processes, scenarios, and sequences disclosed herein for a management system may be implemented. Computing system 600 is an example management system 170, although other examples may exist. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In at least one implementation, communication interface 601 may be used to communicate with one or more hosts of a computing environment, wherein the hosts execute virtual nodes to provide various data processing operations.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes identify module 608, available module 609, and migrate module 610, although any number of software modules may provide a similar operation. Operating software 607 may further include an operating system, utilities, drivers, network interfaces, applications, or some other type of software. When executed by processing circuitry 605, operating software 607 directs processing system 603 to operate computing system 600 as described herein.

In one implementation, identify module 608 directs processing system 603 to identify when a data processing cluster satisfies migration criteria in a computing environment. The migration criteria may comprise a data processing rate, a data throughput or latency associated with accessing the data for the data processing cluster, a change in the data repository processed by the data processing cluster, or some other criteria. When the criteria are satisfied for the cluster, available module 609 directs processing system 603 to determine accommodation data associated with hosts in the computing environment. The accommodation data may be associated with the physical processing resources of the hosts, the accessibility of data to the hosts (e.g., latency, throughput, etc.), or some other accommodation data. For example, when a cluster changes its configuration from processing data from a first distributed file system to processing data from a second distributed file system, management computing system 600 may determine that migration criteria are satisfied. Once satisfied, computing system 600 may determine accommodation data associated with each of the hosts.

After determining the accommodation data, migrate module 610 directs processing system 603 to select one or more hosts to migrate the cluster based on the accommodation data. In some examples, the hosts may be selected based on the hosts that can best accommodate the cluster (i.e., the hosts with best accommodation data), the hosts may be selected based on hosts that provide at least a minimum quality of service for the cluster, or may be selected in any other manner. Once selected, migrate module 610 directs processing system 603 to initiate operations to migrate the cluster from one or more first hosts to the one or more selected hosts. The migration operations may include stopping execution of the cluster on the one or more first hosts, providing images for the one or more virtual nodes of the cluster to the one or more second hosts, initiating execution of the virtual nodes on the one or more second hosts, configuring networking for the virtual nodes, or providing some other operations.

In at least one implementation, management computing system 600 may use the accommodation information associated with the hosts as criteria for migrating a cluster between the hosts. As an example, management computing system 600 may compare the accommodation data associated with a current host or hosts for a cluster against other hosts of the computing environment. When the current host or hosts fails to provide a quality of service comparable to other hosts of the computing environment, management computing system 600 may determine that a migration event has occurred and initiate operations to migrate the cluster to other hosts of the computing environment.

Returning to the elements of FIG. 1, hosts 110-112 and management system 170 may each comprise communication interfaces, network interfaces, processing systems, computer systems, microprocessors, storage systems, storage media, or some other processing devices or software systems, and can be distributed among multiple devices. Examples of hosts 110-112 and management system 170 can include software such as an operating system, logs, databases, utilities, drivers, networking software, and other software stored on a computer-readable medium. Hosts 110-112 and management system 170 may comprise, in some examples, one or more server computing systems, desktop computing systems, laptop computing systems, or any other computing system, including combinations thereof. In some implementations hosts 110-112 may comprise virtual machines that comprise abstracted physical computing elements and an operating system capable of providing a platform for the virtual nodes. Hosts 110-112 may operate on the same physical computing system or may execute across multiple computing systems in these examples.

Data repositories 160 may reside on any computing system or systems that can include communication interfaces, network interfaces, processing systems, computer systems, microprocessors, storage systems, storage media, or some other processing devices or software systems, and can be distributed among multiple devices. Data repositories 160 may be located on one or more server computing systems, desktop computing systems, laptop computing systems, or any other computing system, including combinations thereof.

Communication between hosts 110-112, data repositories 160, and management system 170 may use metal, glass, optical, air, space, or some other material as the transport media. Communication between hosts 110-112, data repositories 160, and management system 170 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between hosts 110-112, data repositories 160, and management system 170 may be a direct link or can include intermediate networks, systems, or devices, and can include a logical network link transported over multiple physical links. In some implementations hosts 110-112 may communicate with data repositories 160 using ethernet, however, it should be understood that the communication may comprise PCIe, Fibre Channel, or some other similar communication protocol.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
executing a data processing cluster on one or more first hosts of a plurality of hosts, the data processing cluster comprising virtual nodes that process data stored in different data repositories of a plurality of data repositories during a lifecycle of the data processing cluster, wherein the virtual nodes comprise containers;
determining when one or more migration criteria are satisfied for the data processing cluster, wherein a first of the one or more migration criteria comprises a data repository from which the data processing cluster is processing data changing from a first data repository of the plurality of data repositories to a second data repository of the plurality of data repositories as part of normal sequential processing of the data by the data processing cluster;
identifying accommodation data associated with the data processing cluster;
determining one or more second hosts of the plurality of hosts for the data processing cluster based on the accommodation data; and
migrating the data processing cluster from the one or more first hosts to the one or more second hosts.

2. The method of claim 1, wherein the plurality of data repositories are stored on computing systems and wherein each of the plurality of data repositories are stored as a distributed file system or as a data object storage element.

3. The method of claim 2, wherein at least a portion of the computing systems comprise the one or more first hosts and the one or more second hosts.

4. The method of claim 1, wherein identifying accommodation data associated with the data processing cluster comprises identifying accessibility data for the plurality of hosts to access the second data repository, wherein the accommodation data comprises at least latency and throughput data.

5. The method of claim 1, wherein the accommodation data comprises at least latency and throughput data to access the data repository.

6. The method of claim 5, wherein the accommodation data further comprises physical processing resources of the plurality of hosts.

7. The method of claim 1, wherein determining when the one or more migration criteria are satisfied for the data processing cluster comprises determining when a data processing rate of the data processing cluster fails to satisfy a minimum data processing rate.

8. The method of claim 1, wherein the one or more first hosts and the one or more second hosts comprise virtual machines.

9. The method of claim 1, wherein the virtual nodes provide a plurality of distributed data processing operations.

10. A computing apparatus comprising:
one or more non-transitory computer readable storage media;
a processing system operatively coupled to the one or more non-transitory computer readable storage media; and
program instructions stored on the one or more non-transitory computer readable storage media that, when executed by the processing system, direct the processing system to:
execute a data processing cluster on one or more first hosts of a plurality of hosts, the data processing cluster comprising virtual nodes that process data stored in different data repositories of a plurality of data repositories during a lifecycle of the data processing cluster, wherein the virtual nodes comprise containers;
determine when one or more migration criteria are satisfied for the data processing cluster, wherein a first of the one or more migration criteria comprises a data repository from which the data processing cluster is processing data changing from a first data repository of the plurality of data repositories to a second data repository of the plurality of data repositories as part of normal sequential processing of the data by the data processing cluster;
identify accommodation data associated with the data processing cluster;
determine one or more second hosts of the plurality of hosts for the data processing cluster based on the accommodation data; and
migrate the data processing cluster from the one or more first hosts to the one or more second hosts.

11. The computing apparatus of claim 10, wherein the plurality of data repositories are stored on computing systems and wherein each of the plurality of data repositories are stored as a distributed file system or as a data object storage element.

12. The computing apparatus of claim 11, wherein at least a portion of the computing systems comprise one or more first hosts and the one or more second hosts.

13. The computing apparatus of claim 10, wherein identifying accommodation data associated with the data processing cluster comprises identifying accessibility data for the plurality of hosts to access the second data repository, wherein the accommodation data comprises at least latency and throughput data.

14. The computing apparatus of claim 10, wherein the accommodation data comprises at least latency and throughput data to access the data repository.

15. The computing apparatus of claim 10, wherein the one or more first hosts and the one or more second hosts comprise virtual machines.

16. The computing apparatus of claim 10, wherein the virtual nodes provide a plurality of distributed data processing operations.

17. A system comprising:
a plurality of hosts:
a management system configured to:
execute a data processing cluster on one or more first hosts of the plurality of hosts, the data processing cluster comprising virtual nodes that process data stored in different data repositories of a plurality of data repositories during a lifecycle of the data processing cluster, wherein the virtual nodes comprise containers;
determine when one or more migration criteria are satisfied for the data processing cluster, wherein a first of the one or more migration criteria comprises a data repository from which the data processing cluster is processing data changing from a first data repository of the plurality of data repositories to a second data repository of the plurality of data repositories as part of normal sequential processing of the data by the data processing cluster;
identify accommodation data associated with the data processing cluster;
determine one or more second hosts of the plurality of hosts for the data processing cluster based on the accommodation data; and
migrate the data processing cluster from the one or more first hosts to the one or more second hosts.

18. The system of claim 17, wherein the one or more first hosts and the one or more second hosts comprise virtual machines.

19. The system of claim 17, wherein the virtual nodes provide a plurality of distributed data processing operations.

20. The system of claim 17, wherein the accommodation data comprises at least latency and throughput data to access the active data repository.

* * * * *